United States Patent Office 2,744,895
Patented May 8, 1956

2,744,895

BENZENESULFONYLBENZYLAMINE SALTS OF PENICILLIN

David Aaron Johnson, Syracuse, N. Y., assignor to Bristol Laboratories Inc., Syracuse, N. Y., a corporation of New York No Drawing. Application July 16, 1954,
Serial No. 443,965

5 Claims. (Cl. 260—239.1)

The present invention relates to new, non-toxic, amine salts of penicillin, more particularly to penicillin salts of substituted amino-methyl-diphenyl sulfones, which are capable of exerting a repository antibiotic action and are also useful for oral, therapeutic administration, for external application, for use as a growth-stimulating supplement, as in animal and poultry feeds, drinking water and by implantation, and for use to stimulate the growth of plants, such as radishes, oats and grass.

The new penicillin salts of the present invention have the following formula:

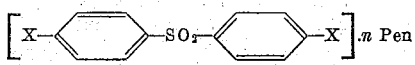

wherein Pen designates an acid penicillin, $n$ is an integer from one or two inclusive equal to the number of nitrogen atoms in the cation of the salt, and X is a member selected from the group consisting of hydrogen and

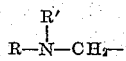

no more than one X representing hydrogen, wherein R represents a member selected from the group consisting of alkyl, aryl and aralkyl and R' represents a member selected from the group consisting of hydrogen, alkyl, aryl and aralkyl, and R and R' when taken together with the nitrogen atom represent a member selected from the group consisting of piperidino, pipecolino, morpholino, pyrrolidino and N'-lower alkyl-piperazino.

The products of the present invention may be obtained by reaction of penicillin acid with substituted aminomethyl-diphenyl sulfones in a water-immiscible organic solvent or by the metathetical reaction in water of a water-soluble penicillin salt and a water-soluble salt of substituted amino-methyl-diphenyl sulfones.

A more comprehensive understanding of this invention is obtained by reference to the following examples which are illustrative only and are not the exclusive embodiment of the invention.

EXAMPLE I

*4-bromomethyldiphenyl sulfone*

Phenyl p-tolyl sulfone (116 g., 0.50 mole) was suspended in 500 ml. carbon tetrachloride and heated to reflux in glass. Bromine (25.7 ml., 0.50 mole) was dropped in as fast as it was decolorized while the reaction was illuminated with two #2 photoflood lamps. The addition required one hour. The hot solution was filtered and cooled, depositing 125 g. (81% yield) colorless 4-bromomethyldiphenyl sulfone, melting after recrystallization from isopropyl alcohol at about 116.5°–118° C. (uncorrected).

*p-Benzenesulfonylbenzyl-1,1,3,3-tetramethyl-n-butylamine*

4-bromomethyldiphenyl sulfone (31.1 g.; 0.10 mole) and 1,1,3,3-tetramethylbutylamine (35 ml., 0.21 mole) were heated under reflux in 150 ml. toluene for two hours, cooled and the 1,1,3,3-tetramethylbutylamine hydrobromide which separated was removed by washing with two 100 ml. portions of water. After the addition of 75 ml. of 3N HCl, the toluene was stirred in an ice-bath and the product, p-benzenesulfonyl 1,1,3,3-tetramethylbutyl-n-butylamine hydrochloride which precipitated was collected by filtration, washed with toluene and with water, dried in air and found to weigh 26.0 g. (65% yield) and to melt at about 250°–252° C. with decomposition (uncorrected) after recrystallization from 200 ml. 95% ethanol as colorless needles. The acetate melts at about 130°–133° C. and precipitates as colorless needles upon acidification with acetic acid of a solution of base in ether; the melting point was about 134°–135° C. (uncorrected) after recrystallization from benzene.

*N - (p - benzenesulfonylbenzyl) - 1,1,3,3 - tetramethyl - n-butyl-amine penicillin G*

N(p-benzenesulfonylbenzyl) - 1,1,3,3 - tetramethyl - n-butylamine hydrochloride (3.96 g., 0.01 mole) was dissolved in 100 ml. 50% aqueous acetone and added to a solution of potassium penicillin G (3.72 g., 0.01 mole) in 100 ml. water. The product, N(p-benzene-sulfonylbenzyl)-1,1,3,3-tetramethyl-n-butylamine penicillin G precipitated, was washed by decantation with 300 ml. water in the cold, collected by filtration, washed with three 50 ml. portions of water, dried in air, and found to weigh 6.50 g. (89% yield), to melt at about 154°–157° C. (with decomposition, uncorrected), to have a solubility in water of about 858 u/ml. at 25° C. and, upon recrystallization from aqueous acetone, to give colorless needles melting at about 150°–152° C. with decomposition (shrinks 145°; uncorrected), containing one molecule of water of crystallization (calculated 2.53; found 2.18) and to contain after correction for water content 64.3% carbon and 7.17% hydrogen (calculated for $C_{37}H_{47}N_3O_6S_2$: C, 64.0; H, 6.83).

EXAMPLE II

*N(p-benzenesulfonylbenzyl)-t-butylamine*

Phenyl p-tolyl sulfone (58 g., 0.25 mole) dissolved in 100 ml. nitrobenzene at 160° C. was treated with 13 ml. (0.25 mole) bromine in 50 ml. nitrobenzene, which was added over 75 minutes through a funnel extending below the surface of the liquid. The mixture was cooled to 15° C. and 106 ml. (1.0 mole) t-butyl-amine was added while cooling in an ice bath; the reaction was then heated to 100° C. for forty-five minutes, cooled to room temperature and washed with water (100 ml.). The aqueous wash was extracted with toluene (50 ml.). The combined toluene and nitrobenzene solutions were washed with saturated aqueous sodium chloride (100 ml.), chilled and stirred ten minutes with 50 ml. concentrated hydrochloric acid. The product, N-(p-benzenesulfonylbenzyl)-t-butylamine hydrochloride, precipitated, was collected by filtration, washed with 50 ml. toluene and then three 50 ml. portions of water, dried to constant weight in air and found to weigh 72.0 g. (85% yield). The product after recrystallization from aqueous isopropyl alcohol melted at greater than 300° C.

*Analysis.*—Calculated for $C_{17}H_{22}NO_2SCl$:

| | Calculated | Found |
|---|---|---|
| C | 60.0 | 59.8 |
| H | 6.52 | 6.28 |
| N | 4.14 | 4.11 |
| Cl | 10.5 | 10.2 |

*N(p-benzenesulfonylbenzyl)-t-butylamine penicillin G*

N(p-benzenesulfonylbenzyl) - t - butylamine hydrochloride (17.0 g., 0.05 mole) was dissolved with warming in 400 ml. 50% aqueous methanol, cooled to 30° C. and then added rapidly to a stirred solution of potassium penicillin G (19.6 g., 0.0525 mole) in 500 ml. water at 15° C. The resulting suspension of the product, N(p-benzene-sulfonylbenzyl)-t-butylamine penicillin G, was stirred in an ice-bath for several minutes and again for an hour after the addition of one liter of water; the product was then collected by filtration, washed free of chloride ion with water, dried in air and found to weigh 30.0 g. (91.5% yield) and to melt at about 153°-155° C. with decomposition (corrected).

EXAMPLE III

N(p-benzenesulfonylbenzylidene)-benzylamine p-Benzenesulfonylbenzaldehyde (37.0 g.; 0.15 mole) was suspended in 150 ml. methanol (containing a few ml. of benzylamine to prevent acid-catalyzed acetal formation) and heated on a steam bath until most of the aldehyde dissolved. The remainder of the benzylamine (18.2 ml.; 0.165 mole) was added, producing a clear solution for several seconds before rapid and exothermic crystallization of the product, N-(p-benzenesulfonylbenzylidene) benzylamine, began. After chilling in an ice-bath, the product was collected by filtration, washed with cold methanol, dried in air, and found to weigh 41.5 g. (82.5% yield) and to melt at about 151°-151.5° C. (corrected) after two recrystallizations from isopropyl alcohol.

*Analysis.*—Calculated for $C_{20}H_{17}NO_2S$:

|   | Calculated | Found |
|---|---|---|
| C | 71.63 | 71.8 |
| H | 5.11 | 5.39 |
| N | 4.18 | 4.16 |

N(p-benzenesulfonylbenzyl) benzylamine

To N-(p-benzenesulfonylbenzylidene)-benzylamine (40.2 g.; 0.12 mole) suspended in 250 ml. methanol, there was added one teaspoonful of Raney nickel catalyst. The mixture was hydrogenated under about 50 p. s. i. hydrogen, heating to about 53° C., until about one equivalent of hydrogen was absorbed. The catalyst was removed by filtration and 20 ml. concentrated hydrochloric acid was added to the filtrate. The filtrate was diluted with water until turbid, chilled and then diluted with additional water to a total volume of 750 ml. The colorless crystalline product, N(p-benzenesulfonylbenzyl)-benzylamine hydrochloride, was collected by filtration, washed with water, dried in air and found to weigh 39.6 g. (88% yield) and to melt at about 203°-204.5° C. after successive recrystallizations from 90% isopropyl alcohol and aqueous methanol.

*Anaylsis.*—Calculated for $C_{20}H_{20}NO_2SCl$:

|   | Calculated | Found |
|---|---|---|
| C | 64.3 | 64.25 |
| H | 5.62 | 5.40 |
| S+Cl | 18.06 | 18.08 |

N-(p-benzenesulfonylbenzyl) benzylamine penicillin G

N-(p-benzenesulfonylbenzyl) benzylamine hydrochloride (15.0 g.; 0.040 mole) dissolved in 100 ml. acetone and 50 ml. water was added to a stirred solution of potassium penicillin G (16.4 g.; 0.044 mole) in 200 ml. water and 50 ml. acetone. Crystallization of the product, N-(p-benzenesulfonylbenzyl)-benzylamine penicillin G, began at once. After the addition was complete, 500 ml. water was added, the suspension was stirred in an ice-bath until cooled to 10° C., and the product was collected by filtration, washed well with water, dried to constant weight in air (25.8 g.; 91% yield as dihydrate) and found to have a potency of 766 u/mgm. (theory: 840 for the dihydrate)

and to be soluble in water at room temperature to the extent of about 200 u/ml.

*Analysis.*—Calculated for $C_{36}H_{37}N_3O_6S_2 \cdot 2H_2O$:

|   | Calculated | Found |
|---|---|---|
| $H_2O$ | 5.08 | 4.42 |
| C | 61.0 | 61.3 |
| H | 5.79 | 5.88 |
| S | 9.05 | 8.80 |

EXAMPLE IV

Bis-p-(benzylaminomethyl)phenyl sulfone 4,4'-diformyldiphenyl sulfone (30.1 g.; 0.10 mole; Beilstein 8, 84) containing 1½ molecules of water was heated on the steam bath in 200 ml. methanol with 24.7 ml. (0.22 mole) benzylamine for fifteen minutes, cooled and the product, having the formula

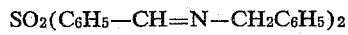

$$SO_2(C_6H_5-CH=N-CH_2C_6H_5)_2$$

was collected by filtration (40.0 g.; 88.5% yield) and 38.4 g. (0.085 mole) was suspended in 250 ml. methanol to which one teaspoonful of Raney nickel catalyst was added. This mixture was hydrogenated under about 50 p. s. i. hydrogen, heating to about 53° C. until about two equivalents of hydrogen were absorbed. During the hydrogenation 0.5 g. of 30% palladium-on-charcoal catalyst was added. The catalyst was removed by filtration and 25 ml. concentrated hydrochloric acid and 500 ml. water was added to the filtrate. The colorless precipitate of the product, bis-p-(benzylaminomethyl)phenyl sulfone dihydrochloride, was collected by filtration, washed with water, dried and found to weigh 32.0 g. (71.5% yield) and to melt at about 300° C. with decomposition.

The product was converted to the crystalline diacetate M. P. about 132°-134° C. (corrected) by shaking with ether and sodium hydroxide and adding glacial acetic acid to the separated, water-washed ethereal layer; the diacetate melted at about 133°-135° C. (corrected) after recrystallization from toluene.

*Analysis.*—Calculated for $C_{32}H_{36}N_2O_6S$:

|   | Calculated | Found |
|---|---|---|
| C | 66.65 | 66.8 |
| H | 6.29 | 6.29 |
| N | 4.86 | 5.08 |

Bis-p-(benzylaminomethyl)phenyl sulfone di-penicillin G

Bis-p-(benzylaminomethyl)phenyl sulfone diacetate (11.52 g.; 0.02 mole) in 100 ml. of 50% aqueous acetone was added in one portion to 16.4 g. (0.044 mole) potassium penicillin G in 100 ml. 50% aqueous acetone. The clear solution was diluted with water, as the product crystallized out to a volume of 800 ml. and chilled in an ice-bath for one hour. The crystalline product, bis-p-(benzylaminomethyl)-phenyl sulfone di-penicillin G, was collected by filtration, washed three times with 50 ml. water, dried in the air to constant weight (20.6 g.; 89% yield) and found to have a potency of about 960 u/mgm. (theory for dipenicillin G dihydrate: 1020 u/mgm.) and a solubility in water at room temperature of about 915 u/mgm. and to melt at about 140°-145° C. with decomposition (shrinks at 120° C., corrected).

*Analysis.*—Calculated for $C_{60}H_{64}N_6O_{10}S_3 \cdot 2H_2O$:

|   | Calculated | Found |
|---|---|---|
| C | 62.1 | 61.9 |
| H | 5.90 | 5.95 |
| S | 8.28 | 8.25 |
| $H_2O$ | 3.10 | 3.92 |

While the present invention has been described with particular reference to the salts of penicillin G it will be understood that the salts of other penicillins are also incuded within the scope of this invention. For instance, penicillins such as the penicillins G, F, X, dihydro F, O, BT, and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl oxide, methyl isobutyl ketone, methylene dichloride, ethylene dichloride and chloroform. Recovery of the product may be increased by evaporating the solvent in vacuo at low temperatures.

It will be understood also that the solution in an organic solvent of the free amine may be prepared in the organic solvent by the use of caustic to liberate the free amine from an organic-solvent soluble or water soluble salt such as the hydrochloride, phosphate, nitrate, hydrobromide, sulfate, citrate, acetate and tartrate.

The penicillin salts of the present invention whether alone or in combination with other therapeutic agents, are used as a simple powder, as tablets, as troches, as lozenges or in capsules. Aqueous suspensions are prepared in advance or in situ when the stability of other added agents (e. g. potassium benzyl-penicillin) so requires, and are a highly acceptable oral dosage form. A particularly useful oral dosage form is a suspension in a palatable, acceptable edible oil; coconut oil is preferred, particularly when free of tristearin or having a setting point less than 60° F. and gelled with an aluminum stearate (of U. S. Patent 2,507,193). The salts of the present invention are admixed with suitable buffers or pharmaceutical additives, preservatives, diluents, binders, lubricants, masticatory substances, colors, flavors, suspending agents, dispersing agents, resuspending agents, and stabilizing agents as desired.

The penicillin salts of the present invention, alone or in combination with other therapeutic agents, are presented for parenteral use as a suspension in an injectable oil (e. g. peanut oil), as a suspension in a gelled injectable oil (e. g. peanut oil gelled with 2% aluminum monostearate), as an aqueous suspension or as a powder to which a sterile, aqueous diluent is added before use to generate an injectable suspension. These aqueous suspensions often advantageously contain non-toxic suspending or dispersing agents, such as sodium carboxymethyl-cellulose, methylcellulose, polyvinyl alcohol, polyvinyl-pyrrolidone, gum tragacanth, gelatin, pectin, alginates, dextrans, gum karaya, lecithin, Spans, Tweens, Amerchols, inositolphosphoric acids and their non-toxic salts (e. g. sodium phytate), glyceryl monostearate, Kreelon CD, polyoxyalkylene-sorbitols, nor more than 2.0 percent of an injectable oil such as peanut oil and condensation products, having molecular weights greater than 1500, of ethylene oxide with a condensation product of propylene oxide with propylene glycol (e. g. Pluronic F 68). On occasion, it is advantageous to actually coat the particles of penicillin salt, at least in part, with one of these agents, e. g. lecithin.

If desired, buffering agents are added such as sodium citrate or sodium phosphates, as when the penicillin salts of this invention are used with an alkali metal salt of penicillin. When appropriate, as when used with excess added free base of the amine used to form the salt of penicillin, the suspensions may be buffered by the addition of free acids, e. g. citric acid, phosphoric acid. If desired, a stabilizing agent is added, such as sodium hexametaphosphate, hexamethylenetetramine or sodium phytate. Small amounts of preservative are often used, e. g. phenol, cresol, or alkyl esters of p-hydroxy-benzoic acid. Useful variations in the properties of the penicillin salts of the present invention are obtained by altering particle size or shape, as by varying procedures of crystallization or, most easily, by mechanical means such as grinding, hammer-milling, pulverizing, or micronizing.

When desired for specific purposes, administered by appropriate routes, and rendered pharmaceutically compatible as described in the art for other salts of penicillin, there may be admixed with the penicillin salts of the present invention, and particularly those prepared for oral use, one or more of various other medicaments such as antihistamines, sulfa drugs (e. g. sulfadiazine, sulfamerazine, sulfamethazine, sulfacetamide, sulfanilamide, sulfapyridine, sulfathiazole, sulfapyrazine, sulfaguanidine, sulfathalidine, sulfasuxidine, sulfasoxazole, sulfamylon, phthalylsulfacetamide, N'-3, 4-dimethylbenzoylsulfanilamide, benzylsulfanilamide, and N'-(2-quinoxallyl)-sulfanilamide), vitamins (e. g. vitamins A, B1, B2, B6, B12, and members of that family, folic acid and members of that family, vitamins G, D2, D3, and E, lipotropic agents, stimulants (e. g. caffeine, amphetamines), analgesics (e. g. aspirin, salicylamide, sodium gentisate, p-acetylaminophenol, phenacetin, codein), laxatives (e. g. phenolphthalein) sedatives (e. g. barbiturates, bromides), and other salts of penicillin (e. g. potassium penicillin G, procaine penicillin G, 1-ephenamine penicillin G, dibenzylamine penicillin G, N,N'-dibenzylethylenediamine dipenicillin G, N-benzyl-beta-phenethyl-amine penicillin G, N,N'-bis-(dehydroabiethyl)-ethylenediamine dipenicillin G and other salts disclosed by U. S. Patent 2,627,491; these combinations are particularly useful to enable variation of the pattern of blood levels obtained), other antibiotic agents (e. g. streptomycin, dihydrostreptomycin, neomycin, bacitracin, polymixin, tyrothricin, erythromycin, chlorotetracycline, oxytetracycline, tetracycline, chloramphenicol, magnamycin) in some cases such combinations attack a wider range of organisms or show synergistic efficacy or provide decreased toxicity with equal efficacy; and spreading agents (e. g. hyaluronidase).

Multiple combinations of such added agents are often useful, e. g. sulfadiazine and sulfamerazine to provide equal efficacy and reduced toxicity; substantially equal amounts of a non-toxic acid addition salt of streptomycin (sulfate; levo pimaric-6, 8a-cis-endosuccinate) and a non-toxic acid addition salt of dihydrostreptomycin (sulfate; sulfate iodide) to provide equal efficacy and reduced toxicity; aspirin; phenacetin and caffeine; multiple vitamins.

Further information which is readily applied to formulations and combinations of the penicillin salts of the present invention is to be found in U. S. Patents 2,602,038; 2,608,509; 2,608,507; 2,619,447; 2,515,898; 2,533,066; 2,507,193; and 2,578,651.

The free bases and their soluble acid addition salts are useful to prepare therapeutic penicillin salts of high water-insolubility; these free bases, as such or as their non-toxic organic or inorganic salts, are also non-toxic and useful as analgesics, soporifics and antimicrobial agents.

I claim:

1. A salt of penicillin having the formula

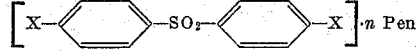

wherein Pen designates an acid penicillin, $n$ is an integer from one to two inclusive equal to the number of nitrogen atoms in the cation of the salt, and X is a member selected from the group consisting of hydrogen and $$\begin{array}{c} R' \\ | \\ R-N-CH_2- \end{array}$$

no more than one X representing hydrogen, wherein R represents a member selected from the group consisting of benzyl and alkyl containing less than nine carbon atoms and R' represents hydrogen.

2. N-(p-benzenesulfonylbenzyl) - 1,1,3,3 - tetramethyl-n-butylamine penicillin G.

3. N-(p-benzenesulfonylbenzyl) - t - butylamine penicillin G.

4. N-(p-benzenesulfonylbenzyl)benzylamine penicillin G.

5. Bis-p-(benzylaminomethyl)phenyl sulfone di-penicillin G.

References Cited in the file of this patent

UNITED STATES PATENTS

| | | |
|---|---|---|
| 2,627,491 | Szabo et al. | Feb. 3, 1953 |
| 2,676,173 | Hietmann et al. | Apr. 20, 1954 |

FOREIGN PATENTS

| | | |
|---|---|---|
| 1,052,602 | France | Sept. 23, 1953 |

OTHER REFERENCES

Tatsuoaka et al.: "J. Pharm. Soc. Japan," vol. 73 (1953), pp. 1183–85.